4. Sheets-
Sheet-2.
C. E. Detmold.
Furnace.
No 68. Reissued Feb. 20. 1845.
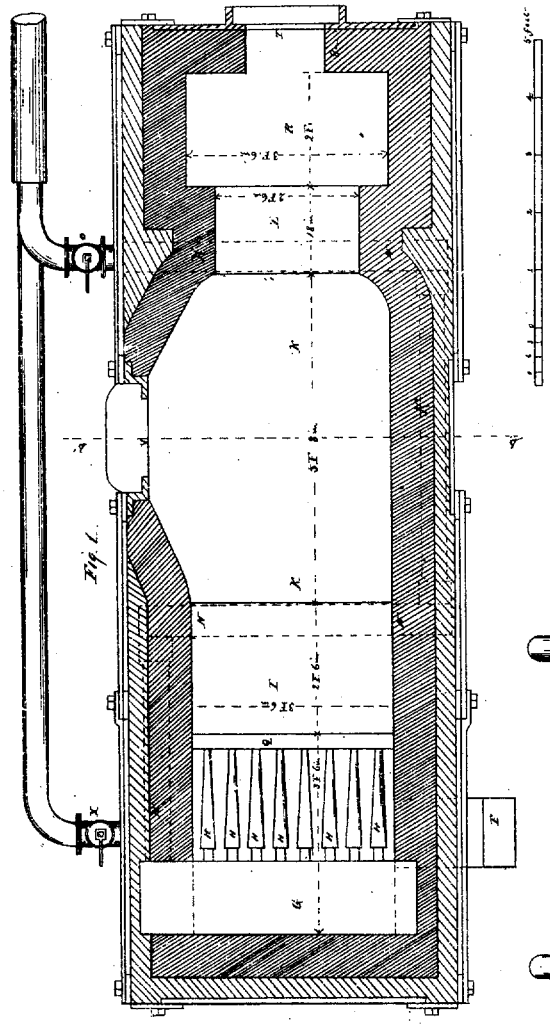
Vertical cross section on line bb
Fig. 2.
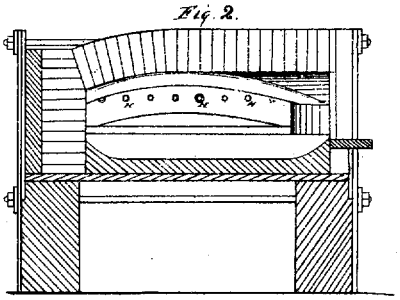
End View
Fig. 3.
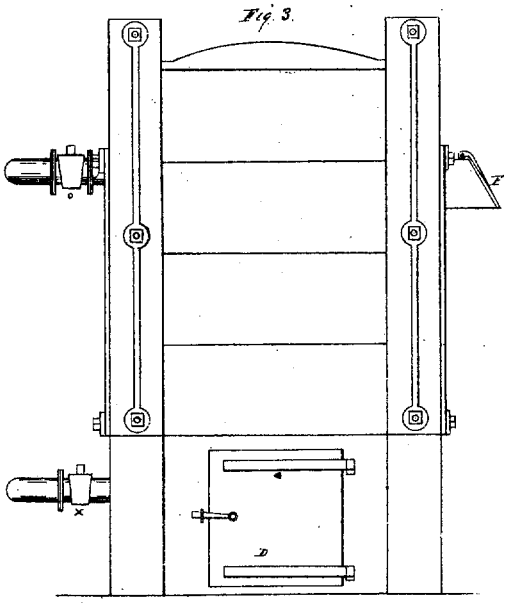
Wilnesses
M. E. Moore
H. G. Moore
Inventor
C. E. Detmold

C. E. Detmold.
4 Sheets.
Sheet 2.
Furnace.
No 68.
Reissued Feb. 20. 1845.
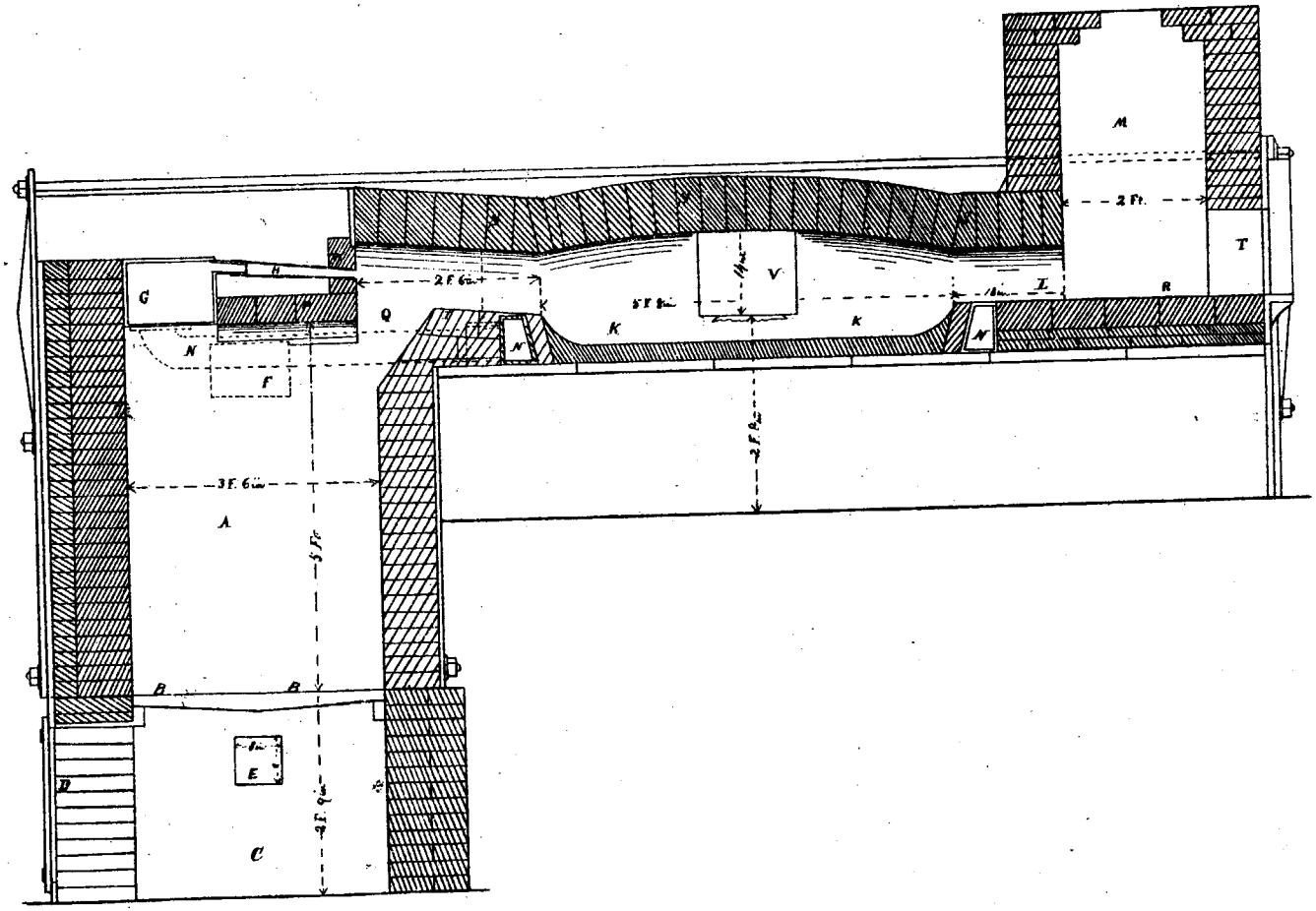
Longitudinal Vertical Section of Puddling Furnace 4 Sheets.
Sheet. 3.
C. E. Detmold.
Furnace.
No 68.
Reissued Feb. 20. 1845.
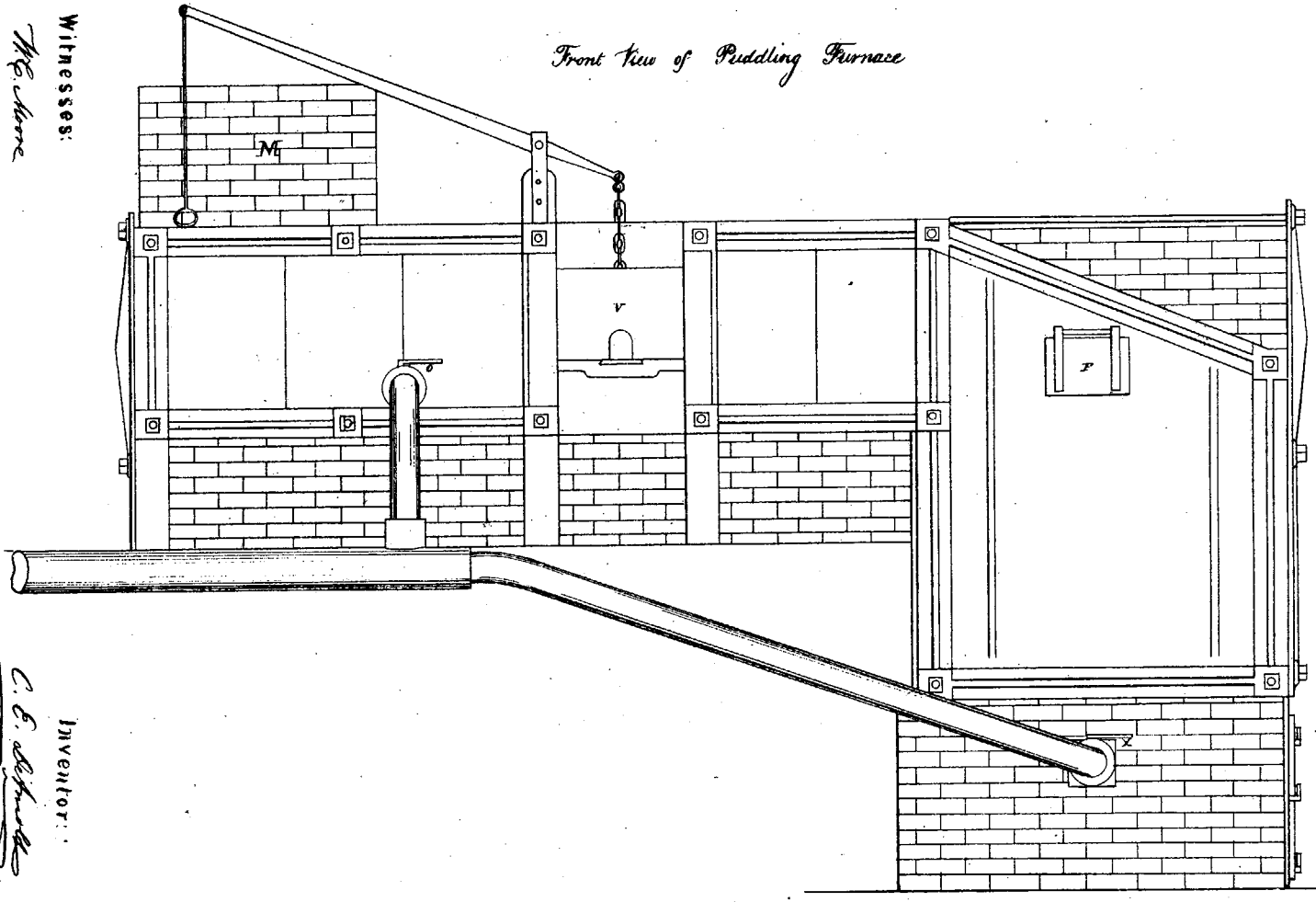
Witnesses:
W. C. Moore
Geo. C. Moore
Inventor:
C. E. Detmold

C. E. Detmold.
Furnace.
No 68. Reissued Feb. 20. 1845.
Fig. 1. Longitudinal Vertical Section
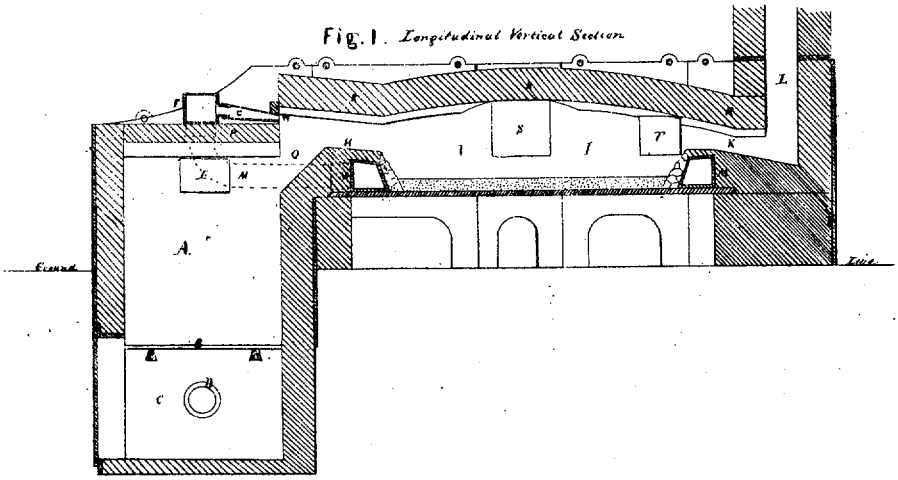
Fig. 2. Horizontal Section
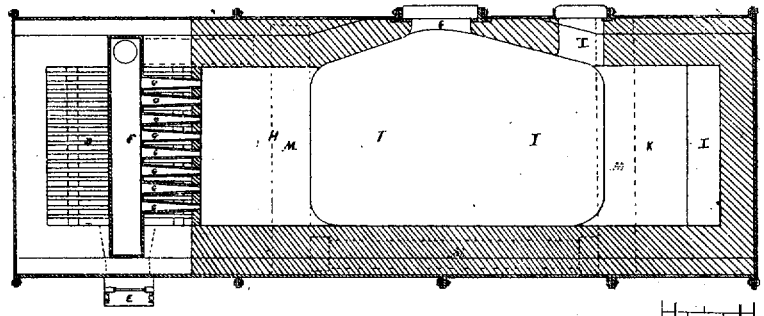
Scale of ⅛ Inch p. Foot
Fig. 3. Front View
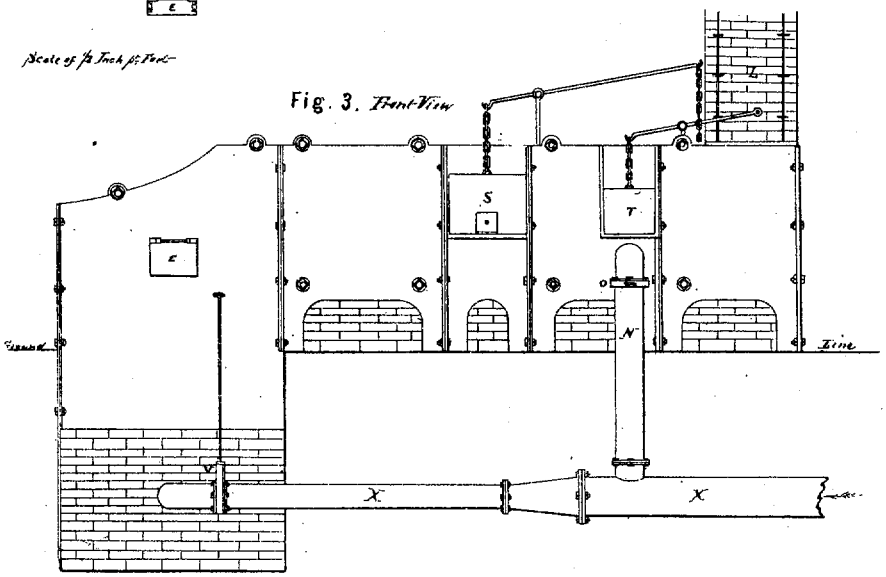
Witnesses:
Thos. Chessus
R. B. Coleman
Inventor:
C. E. Detmold

UNITED STATES PATENT OFFICE.

C. E. DETMOLD, OF NEW YORK, N. Y.

IMPROVEMENT IN THE CONSTRUCTION AND HEATING OF FURNACES FOR METALLURGIC OPERATIONS.

Specification forming part of Letters Patent No. 3,176, dated July 15, 1843; Reissue No. 68, dated February 20, 1845.

*To all whom it may concern:*

Be it known that I, CHRISTIAN EDWARD DETMOLD, civil engineer, of the city of New York, N. Y., have invented a new and useful improvement in the construction and heating of furnaces for all kinds of metallurgic operations, and which is applicable also to the heating of boilers and various other purposes requiring a high temperature, of which the following is a full and exact description.

My invention is intended as an improvement on the process of and apparatus for applying the combustible gases from blast and cupola furnaces to the manufacture of bar-iron and other purposes invented by Wilhelm Von Faber du Faur, and for which Letters Patent of the United States were granted to me as the assignee of the said Wm. Von Faber; and it consists in such a modification of the grate or fire-chamber of reverberatory furnaces as enables me always to have a very thick stratum of fuel upon the grate, which fuel is converted into combustible gases by a blast or current of air forced into a closed ash-pit under the grate, and in the combination of this gas-generating chamber and furnace with an arrangement of blow-pipes or other convenient apparatus through which heated atmospheric air is to be forced by means of any ordinary blowing-machine into the said gases for the purpose of effecting their combustion in their passage to the main chamber of the furnace, where the heat is to be applied, as hereinafter more fully described.

To explain more fully my improvement, and to enable those skilled in the art of constructing furnaces and working metals to use the same, I proceed to describe it more particularly as applied to a puddling-furnace for converting crude or cast iron into malleable iron, it being understood that the same arrangement of parts is equally applicable to all other kinds of furnaces, forges, boilers, &c., reference being had to the annexed drawings, in all the figures of which the same letters refer to the same parts throughout.

Figure 1 is a vertical longitudinal section of a puddling-furnace. Fig. 2 is a plan or horizontal section, the arch P being removed so that the grate of the gas-generating chamber may be seen. Fig. 3 is a front view of the same.

A is the fire-chamber, built of fire-proof material. It differs from ordinary reverberatory furnaces in this, that its depth is much greater, so that there may always be a very thick stratum of fuel upon the grate, which is indispensable for the purpose of converting all the fuel into combustible gases. This part of the furnace I call the "gas-generating chamber." Its depth may be from three to five feet, more or less, according to the nature of the fuel to be used. When bituminous coal is employed, I find three feet sufficient, and with anthracite coal from four to five feet.

B is the grate upon which the fuel rests.

C is the ash-pit, which has a door in front by which it may be closed entirely.

D is an opening in one of the sides of the ash-pit, through which atmospheric air is blown in by means of any ordinary blowing-machine.

E is the stoking-door, for filling the chamber A with fuel.

F is a hot-air chamber, from which issues a row of blow-pipes, G G G G G G G, of about one and one-half inch diameter at the mouth or nozzle. As represented, there are eight; but a greater or less number may be employed, it being necessary, however, that the aggregate sectional area of the blow-pipes be sufficient to supply the requisite quantity of air for the complete combustion of the gases generated.

H is the fire-bridge, over which the combustible gases and streams of heated air become mixed and combustion effected. The fire-bridge is made longer than in ordinary furnaces, so as to afford the gases and the hot air time to become thoroughly incorporated before reaching the main chamber of the furnace.

I I is the main chamber, where the iron is puddled.

K is the flue or throat of the furnace.

L is the chimney through which the burned gases finally escape.

M M is a cast-iron pipe, of any convenient form, which is built into the walls of the furnace so as to surround, in part, the hearth. This pipe connects with the hot-air chamber F, as shown by the dotted lines, and with the pipe N N, through which it receives a current of atmospheric air, which in its passage around the sides of the furnace becomes sufficiently heated to effect the rapid combustion of the gases, while at the same time it tends to keep the sides of the furnace cool, so as to protect them from the intense heat. The air may also be heated by causing it to pass through an arrangement of pipes placed in the chimney, or in any other convenient way.

O is a valve, by means of which the quantity of air for the combustion of the gases may be duly regulated.

P is an arch, of fire-brick, which forms the top of the generating-chamber, and serves at the same time to protect the blow-pipes from the action of the fire. Their proper protection is of essential importance to the successful application of this apparatus, and I effect it by the above-named arch under them, leaving the blow-pipes exposed to the cooling action of the atmosphere, their nozzles or mouths being inserted through a range of fire-brick or fire-clay, as shown at W, by which the roof of the furnace R is connected with the arch P.

I have tried other modes of protecting the blow-pipes, but have found none so effectual as that above described.

Q is the passage through which the combustible gases pass over the fire-bridge to the main chamber I I.

R R R is the roof of the furnace.

S is the working-door.

T is a smaller door, through which the pig-iron may be charged upon the further end of the hearth.

V is a valve for regulating the supply of cold air under the grate.

X X is a pipe through which the air is brought from any blowing-machine.

All other parts of the furnace are essentially the same as in ordinary puddling-furnaces.

The mode of operating with one of my improved furnaces is as follows: The gas-generating chamber A is filled with any kind of fuel, which is ignited in the ordinary manner. By means of any blowing-machine air is blown into the ash-pit C through the aperture E, which causes the partial combustion of the lower stratum of fuel immediately upon the grate-bars. A great portion of the gases resulting from this will be a combustible gas—namely, the carbonic-oxide gas—which is invariably produced when the proportion of carbon is in excess to that of oxygen. The rest is carbonic-acid gas, which in its passage through the superincumbent mass of ignited coal absorbs an additional dose of carbon, and is thereby also converted into carbonic-oxide gas. The small portion of hydrogenous gases that may be contained in the fuel—such as carbureted and bicarbureted hydrogen—will be evolved or distilled by the heat, and thus all the fuel in the gas-generating chamber is converted into combustible gases, which are burned in their passage over the fire-bridge by being mixed with a number of continuous jets of highly-heated atmospheric air injected through the blow-pipes, thus producing an intense temperature in the main chamber of the furnace, where the heat is to be applied, while the temperature of the fuel in the gas-generating chamber is comparatively low, being kept at a red heat only, whereas in the ordinary furnaces the temperature in the fire-chamber or grate is much higher than in the main chamber of the furnace. The pipes through which the air is forced under the ash-pit for the generating of the combustible gases, as well as into the hot-air chamber for their subsequent combustion, being provided with proper valves, the quantity of combustible gases to be generated and the intensity of their combustion can be accurately regulated by admitting a greater or less quantity of air through these valves. As it requires the same quantity of air for the combustion of the carbonic-oxide gas that it does for its formation, and as the air which is forced through the blow-pipes is in a highly-heated state, whereby its bulk or volume is considerably expanded, (being doubled at 460° Fahrenheit,) it is evident that the aggregate sectional area of the blow-pipes must be at least the double of the opening of the valve that admits the air under the ash-pit for the formation of the combustible gases.

The process of puddling, as well as all other operations to be performed in these improved furnaces, are conducted in the same manner as in furnaces of ordinary construction.

The advantages resulting from the application of my improvements are, first, an important economy of fuel; second, an important saving of iron worked in these furnaces; third, a more intense and uniform heat than can be obtained in ordinary reverberatory furnaces.

Having thus given an exemplification of the manner in which I combine and arrange the respective parts of my improvement when applied to a puddling-furnace, from which description any competent person will be able to adapt it to other purposes, I wish it understood that I do not claim as my invention the employing of carbonic-oxide gas in combination with heated atmospheric air, this being known as the invention of Wm. Von Faber du Faur, upon which this is intended as an improvement; but What I do claim as my invention is—

The combination of a reverberatory furnace having a deep fire-chamber for the special purpose of generating combustible gases from any kind of fuel, as above described, with an arrangement of blow-pipes or other convenient apparatus through which continuous jets of highly-heated atmospheric air are forced into the combustible gases in their passage over the fire-bridge, for the purpose of producing their perfect and rapid combustion, substantially as set forth in the above specification.

In testimony whereof I, CHRISTIAN EDWARD DETMOLD, hereto subscribe my name, in the presence of witnesses whose names are hereto subscribed, on the 8th day of January, A. D. 1845.

C. E. DETMOLD.

In presence of—
THOS. CHAMBERS,
R. B. COLEMAN.